April 5, 1938.  G. A. ISING  2,113,255
MEASURING INSTRUMENT
Filed July 28, 1933
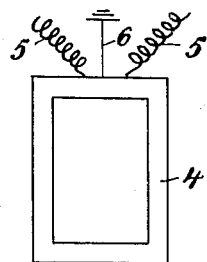
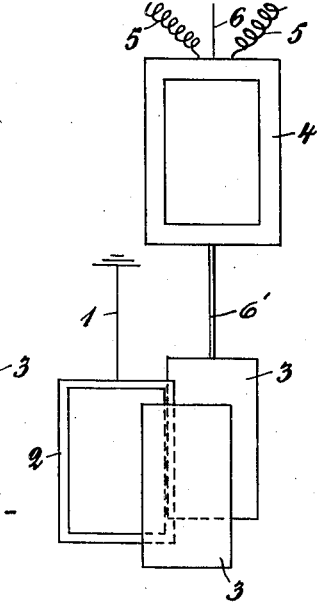
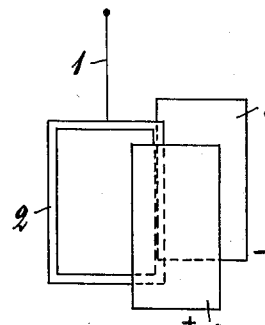
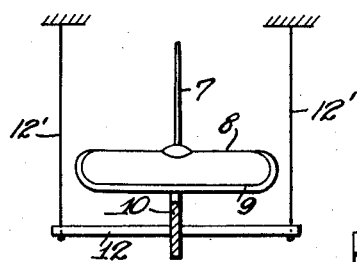
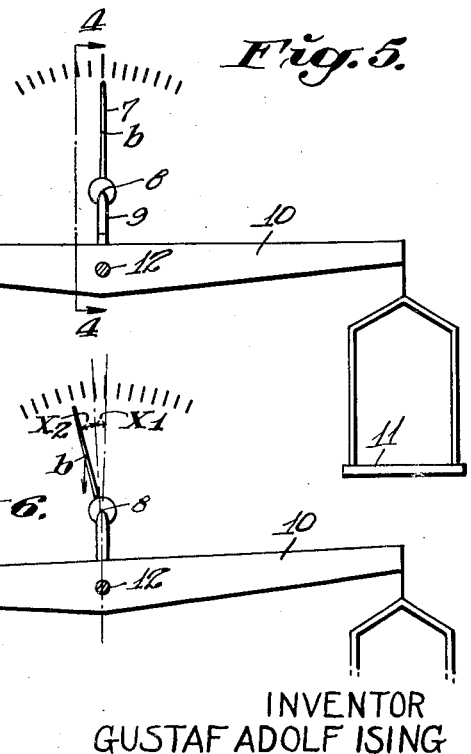
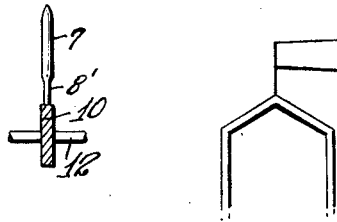
INVENTOR
GUSTAF ADOLF ISING
BY Haseltine Lake & Co.
ATTORNEYS Patented Apr. 5, 1938

2,113,255

UNITED STATES PATENT OFFICE 2,113,255

MEASURING INSTRUMENT

Gustaf Adolf Ising, Stocksund at Stockholm, Sweden

Application July 28, 1933, Serial No. 682,649
In Sweden August 25, 1932

5 Claims. (Cl. 73—151)

The present invention relates to measuring instruments comprising a measuring member that is easily movable about a stable position of equilibrium and adapted to deviate from said stable position of equilibrium under the influence of external forces dependent on the quantity to be measured. Examples of such instruments are galvanometers, electrometers and balances in which the quantity to be measured is a current, or a charge or potential difference, or a mechanical mass.

It is often desirable to be able to measure extremely small deviations of the measuring member which cannot be observed by means of ordinary optical reading devices, as for example through mirror reading or through microscopic reading.

The present invention has for its object to extend greatly the possibilities of observing exceedingly small deviations and consists essentially in mechanically combining the measuring instrument proper or the primary system with an astatized secondary or indicator system the deflection of which, due to the astatization, becomes a multiple of that of the primary system and thereby will be more readily observable. The indicator system comprises an easily movable member adapted to serve as an indicator which is astatized, i. e. is influenced by two opposing directing forces which are mutually so balanced that the deviation of the indicator caused through the deviation of the measuring member in consequence of the mechanical coupling is a multiple of the first mentioned deviation.

The invention will be more clearly described with reference to the accompanying drawing showing diagrammatically different embodiments of the invention. In said drawing Figure 1, for the purpose of explaining the meaning of the terms astatize or astatization, illustrates an astatized system in which the labilizing directing force opposing the stabilizing directing force is produced by an electrostatic field. Figure 2 shows an embodiment of the invention in which the movable measuring member or indicator of an electric measuring instrument is mechanically coupled with the astatized system according to Figure 1. Figure 3 shows another manner of bringing about the coupling with the indicating system in an electric measuring instrument. Figure 4 shows an astatized system in which the labilizing directing force is produced by the gravitational field, and Figure 5 shows an application of said astatized system in a balance. Figure 6 is a view of the Fig. 5 embodiment wherein the balance beam has been rotated through a slight angle, and Figure 7 shows another embodiment of the astatized pendulum.

The general idea of astatization will be readily understood if an astatized system is first considered separately, assuming for the sake of simplicity that the easily movable part of said system is rotatable about a fixed axis. When no external forces are present said movable part takes up a certain stable zero position. When the movable part makes a deviation $x$, and in the assumed case rotates the extent of an angle $x$ from its zero position, a couple $$Q' = -D_0 x$$

acting upon the movable part is set up, which couple is proportional to the deviation. The negative sign indicates that this couple tends to restore the easily movable part of the astatized system to its zero position. The positive constant $D_0$ is generally termed the directive force of the movable system or, more particularly, the stabilizing directive force. As a directive force, for example, the torsional elasticity of a suspension filament, will serve, and thus it is now possible by applying an electrostatic field, to cause the easily movable part of the astatized system to be influenced by an additional couple $Q''$ which counteracts the couple $Q'$, and is also proportional to the deviation $x$. This couple can be expressed by the equation $$Q'' = kx$$

where $k > 0$. The constant $k$ represents a labilizing directive force and the corresponding couple $Q''$ tends to move the easily movable part of the system away from zero position. The couple resulting from both directive forces is $$Q = Q' + Q'' = -(D_0 - k)x = -Dx$$

The resulting directive force $D$ must be positive in order to make the system stable, thus $$D_0 > k$$

It is convenient to define a quantity $$N = \frac{k}{D} = \frac{k}{D_0 - k}$$

as a measure for the degree of astatizism, which may be called the astatization number.

In the astatized system of Figure 1, the easily movable part consists of a metallic frame 2 supported on a suspension filament 1 between two stationary metal plates 3 and occupying in its zero position ($x=0$) an intermediate position between said two plates. It will be assumed that the suspension filament 1 is secured at its upper end in a fixed support. The two plates 3 can be charged from a battery to opposite but numerically equal potentials $\pm V$, whereas the frame 2 is held at zero potential. When there is no electrostatic auxiliary field ($V=0$) the frame will be influenced only by the couple $-D_0 x$ but as soon as V is given a value different from zero an additional positive couple is produced which for small deviations will be equal to $k.x$, where $k$ as before represents the labilizing directive force. The value of $k$ is $k=c.V^2$, where $c$ is a constant dependent on the geometric configuration of the electrostatic field. If, on the other hand, the frame 2 is charged and the plates 3 are held at zero potential a similar result is obtained except that the constant $c$ receives another value. The resulting couple becomes $-(D_0-k)x = -Dx$.

The astatized system illustrated in Figure 4 agrees in principle with that of Figure 1. In both cases astatization is brought about by means of a static field of force, but the only difference is that in Figure 4 the gravitational field is used instead of the electrostatic field of Figure 1. The movable part in Figure 4 consists of a standing pendulum 7 which with its lower thickened end is fixed to a wire 8 horizontally stretched in a holder 9. The pendulum is thus adapted to oscillate about the horizontal axis of the wire and stands vertically when occupying its zero position. The torsional elasticity of the fixing wire 8 produces the stabilizing directive force $D_0$. The labilizing directive force is $k=mgr$, where $m$ is the mass of the pendulum rod, $r$ the distance of its centre of gravity from the axis of rotation and $g$ the acceleration of gravity. A deviation of the pendulum 7 about the axis of the wire 8 thus produces a couple acting on the pendulum according to $$Q = -D_0 x + mgr.x = -(D_0-k)x.$$

An astatized pendulum may also be provided with an inclined axis of rotation although the astatizing of the pendulum then will be highly dependent upon occasional fluctuations in the inclination of the axis, i. e. rotations in the plane of the drawing. For this reason a horizontal axis of rotation is preferable.

Thus the term "astatization" as used in this specification represents a general idea which applies to all embodiments of the present invention. Figures 1 and 2 illustrate only simple examples. Movable systems comprising magnets or conductors carrying current may also be astatized by magnetic fields. Astatized systems are known per se, and in such known systems, the two directing forces $D_0$ and $k$ refer to one and the same stationary system of coordinates, the movable part, for example being suspended as in Figures 1 and 4 or secured to a stationary support. The present invention involves a particular application of such known astatized systems for obtaining as great a multiplication as possible of the deviation in a sensitive measuring instrument.

In the embodiment of the invention shown in Figure 2, the astatized system of Figure 1 is coupled with the moving coil 4 of a moving coil galvanometer, the movable frame 2, instead of being suspended in a stationary support, is here suspended at the lower end of the moving coil, which in turn is secured to a suspension filament 6. The coil receives current through the lead-in wires 5 and the directing force is produced by said lead-in wires and suspension filament 6.

The conditions prevailing in such a combination of a primary measuring member and an astatized system mechanically coupled therewith are readily explained by a simple mathematical reasoning, and it will be assumed that the deviations are so small that the couples produced are proportional to the deviations. When no external force acts on the coil 4 the coil occupies its zero position and the frame 2, which is adapted to turn coaxially with said coil also occupies its position of rest, intermediately between the two charged places 3. It will now be assumed that the coil 4 makes a deviation $x_1$ and that it is held in this position. The frame 2 then makes a deviation $x_2$ which on account of the astaticism is several times greater than $x_1$. The frame 2 is acted upon by the two couples $Q' = -D_0(x_2-x_1)$ and $Q''=kx_2$. The position of equilibrium of the frame 2 is determined by the condition $Q'+Q''=0$, wherefore $$-D_0(x_2-x_1) + kx_2 = 0$$

and consequently (Equation A)

$$x_2 = \frac{D_0}{D_0-k} \cdot x_1 = \frac{D_0}{D} \cdot = (N+1)x_1$$

As already pointed out, this value of $x_2$ is correct, provided that coil 4 has stopped in position $x_1$. The value of $x_2$ defined by the equation is evidently approximately true also during the movement of the coil 4 if said movement is slow in relation to the setting movement of the frame 2. The quantity N is the astatization number of the secondary system, calculated under the assumption that $x_1$ is constant and independent of $x_2$. The greater the number N, the greater $x_2$ will become in relation to $x_1$.

Whereas in Figure 2 the electrostatic field remains at rest and the support of the secondary system (which is represented in Figure 2 by the upper end of the suspension filament 1, secured to the coil 4) follows the deviation of the primary system, the conditions illustrated in Figure 3 are different to the extent that the support of the secondary system 2 is arranged stationary as in Figure 1, whereas the astatizing field is movable. In Figure 3 one of the two charged plates 3 is connected by a rigid connection 6' with the coil and thus turns together with the coil, whereby the electrostatic field is subjected to a displacement. In this case $Q = -D_0 x_2$ and $Q''=kx_2+ax_1$, where $a$ denotes a coefficient whereof the absolute value is generally of the same order of magnitude as $k$. The coefficient $a$ may preferably be expressed $a=b.k$, where $b$ is a numerical factor. The deviation $x_2$ in the condition of equilibrium, assuming a fixed value of $x_1$ can then be calculated from the equation $$-D_0 x_2 + kx_2 + bkx_1 = 0$$

(Equation B)

$$x_2 = \frac{bk}{D_0-k} \cdot x_1 = b.N.x_1$$

It should be noted that when the astatizing coefficient $N>0$ the secondary system reacts on the primary system, so that in the condition of equilibrium the deviation $x_1$ for a certain external couple becomes greater than if there were no coupling with the secondary system. In other words, the stabilizing directing force A acting on the primary system becomes smaller than that value $A_0$ assumed by the directing force when $N=0$. Calculation shows that in the case of Figure 2, the equilibrium of the coupled system (immobile or fixed field) is stable only under the condition $ND_0<A_0$, and that in the case of 'Figure 3 (movable field) it is stable only under the condition $$ND_0 < \frac{A_0}{b^2}$$

These conditions determine an upper limit for the product $ND_0$ for given values of $A_0$. When determining suitable values for $N$ and $D_0$ consideration should be given also to moments of inertia, desired time of oscillation, etc.

With reference to Figure 3 is should also be pointed out that in rotating coil 4, not only is the position of the field varied but also the strength of the field acting on the frame 2, whereby also the coefficient $k$ is subjected to a change proportional to the magnitude of $x_1$. Since it has been presupposed, however, that the deviations are so small that powers of $x_1$ and $x_2$ higher than the first may be neglected, the Equation B still holds true.

The use of gravity for bringing about astatization is suitable when the astatizing coefficient $N$ should be great. Due to the invariable character of the field of gravity, a very constant value for the labilizing directing force $k$ is obtained. For a measuring member having a horizontal axis of rotation, an astatized system comprising a vertically disposed or standing vertical pendulum is used.

Figs. 4 to 6 show an example of such an application. In the embodiment according to Figs. 4 to 6, 10 represents the beam of the balance which is suspended in elastically flexible bands or filaments 12', 12' fastened to the ends of a traverse bar 12 rigidly connected with the beam 10, said bands replacing the ordinary knife edges in order to entirely avoid any frictional effects, and 11 are the pans of the balance. The tongue of the balance consists of a rod-shaped member 7, the lower enlarged end of which is secured to an elastic filament 8 which is suspended under tension between the ends of a bow-shaped holder 9 (compare Fig. 4 of the drawing) rigidly secured to the beam 10. The mutual arrangement of the various members is such that the rod-shaped member 7 is disposed perpendicularly to the filament 8, while the latter extends in a direction parallel with the horizontal axis of rotation of the beam 10.

In Fig. 5, the beam 10 occupies its horizontal position. In this position of the beam the rod-shaped member or tongue 7 is vertically disposed. A vertical line through the center of gravity $b$ of the tongue passes through the filament 8 supporting the tongue, so that in the vertical position of the tongue no turning moment is exerted by the force of gravity on the tongue member in respect to its elastic supporting axis 8. Such a turning moment is, however, set up as soon as the tongue is deflected by some external force either to the left or to the right. As long as the beam 10 remains horizontal, the turning moment of reaction set up in the suspended filament 8 as a result of the twisting thereof is, nevertheless, greater for every angular position of the tongue than the turning moment of gravity, and hence, as soon as the tongue is released, it will immediately return to its vertical position. When the beam 10 occupies its balanced horizontal position, the vertical position of the tongue thus resolves into a stable position of equilibrium.

In Fig. 6, beam 10 has been rotated to an angle $x_1$ from its horizontal position, and this rotation causes the pivoted points of the filament 8 to turn a corresponding angle in relation to the horizontal, and thus also in relation to the direction of the gravity field of force. The turning of the pivotal points of the filament 8 will obviously cause a deflection of the tongue member 7 from its vertical position, so that the force of gravity is caused to exert a turning moment on the tongue, assisting in deflecting the same. The deflection of the tongue 7 stops when it has rotated through an angle in relation to its support 8 having a value $x_2$ which is such that the restoring moment set up in the filament as a result of the twisting thereof, is equal to the turning moment imposed on the tongue by the gravity field of force. The total deflection $x_1+x_2$ of the tongue 7 is thus always greater than the deflection $x_1$ of the beam 10.

As will be clear from the above, the effect of the field of force (in the case considered, the gravity field of force) upon the secondary member (in this case the tongue 7) increases with the deflection of the measuring member, (the beam 10) and for this reason a small deflection of the measuring member can result in a great total deflection of the secondary member.

In the embodiment of the invention illustrated in Fig. 2 of the drawing, the electric field of force produced between two charged metal plates 3 is utilized to influence the secondary member 2, and when this member occupies exactly a middle position between the two plates 3, the total charge of electricity on it will be zero, and there is no resulting attraction or repulsion between the secondary member and the plates. If the filament 1, on account of a deflection of the measuring member 4, which by means of the elastically yielding suspension, is mechanically coupled with the secondary member 2, the latter is moved away from its middle position, and the symmetry of the arrangement will be disturbed, while the secondary member will receive a charge of such sign that the attraction from one of the plates 3 assisted by the repulsion from the other plate 3 will tend to move the secondary member a distance further in the direction of its initial movement. This force exerted on the secondary member will, for small displacements, be proportional to the displacement of the member from its position to equilibrium. The displacement of the secondary member will stop when it has been deflected such an angle in relation to the measuring member that the torque of reaction set up in the twisted filament 1 counterbalances the turning moment caused by the force from the electrostatic field of force.

Fig. 7 shows another embodiment of the astatized pendulum supported on the beam 10, which latter is shown as in Fig. 4 in transversal section. The pendulum 7 in Fig. 7 consists in a vertical rod tapered at its lower end to a flexible elastic stem 8', which in this case forms the yielding connection between the beam and the pendulum and corresponds to the elastic filament 8 in Fig. 4.

The axis of rotation of an astatized pendulum need not necessarily be horizontal. If the axis of rotation is inclined in relation to the horizontal plane and forms an angle $\zeta$ with the latter the labilizing directive force becomes $k = mgr.\cos\zeta$. Generally it is preferable to have the angle $\zeta = 0$, as a greater constancy of $k$ is then obtainable, since the derivative $$\frac{dk}{d\zeta}$$

for $\zeta = 0$, is equal to zero, wherefore accidental changes of inclination have then no appreciable influence.

Such systems have been primarily considered in the preceding description wherein the deviations $x_1$, $x_2$ consist of rotations about definite axes as is usually the case with the movable system of a measuring instrument. However, it is evident that the idea of the invention may be generalized in unaltered form. In carrying out the invention, all such primary and secondary systems can be employed which when taken individually each have a single degree of freedom and the position of which is thus determined by a single parameter (generalized coordinate) $x_1$ or $x_2$ respectively. In order to give the preceding explanations a more general meaning it is only necessary to understand the words "couple" and "directing force" in a more general sense. If, for example, the variation of the position parameter $x$ is a true rendition, the "couple" $Q$ obtains the meaning of a force in the proper sense of the word, and the "directing force" $D_0$ then means that which could be termed a spring constant, i. e. that coefficient of which the product with the displacement $x$ gives the restoring force.

I wish it to be understood that I do not desire to be limited to the exact details of construction shown and described, since obvious modifications will occur to those skilled in this art.

I claim:—

1. In a measuring instrument, the combination, with a balancing measuring member, frictionless, elastic suspending means exclusively supporting said measuring member intermediate the ends thereof and allowing frictionless motion thereof, an upwardly directed indicator member, an elastically yielding connection fixed upon the intermediate portion of said measuring member above the point about which said measuring member moves so as to swing above said point with the measuring member, said elastically yielding connection exclusively supporting said indicator member and allowing the same also to move in unobstructed manner relatively to said measuring member with freedom from friction and from contact with the rest of the instrument, and there being a static field of force operating upon said indicator member tending to accentuate any occurring deflection of the indicator member from upright position by neutralizing the greater part of the elastic coefficient of restoring force inherent in the elastically yielding connection which tends to restore the indicator member to upright position upon return of the measuring member to even balance.

2. A measuring instrument according to claim 1, wherein a pair of upwardly extending spaced supports are fixed upon the intermediate portion of the measuring member and the elastically yielding connection is attached to said spaced supports.

3. A measuring instrument comprising the combination, with a balance beam, of elastic suspension means for said balance beam intermediate the ends of said beam allowing frictional movement thereof about a substantially horizontal axis, an indicator member carried upon said intermediate portion of the beam and comprising a standing pendulum, and an elastically yielding support forming an exclusive and frictionless connection between said intermediate portion of said beam and said pendulum allowing frictionless movement of the pendulum relatively to the beam with freedom from contact with all other portions of the instrument, the weight of said pendulum being sufficient to cause the elastic coefficient of restoring force of the elastically yielding support which tends to restore the pendulum to upright position in normal position of the balance beam to be neutralized by gravity so as to accentuate any occurring deflection of the pendulum from upright position due to movements of the balance beam.

4. In a measuring instrument having a balance beam mounted intermediate the ends thereof for movement about a horizontal axis and a standing pendulum forming an indicator member carried upon said beam, the combination of elastic suspension means for said beam supporting the same at the intermediate portion thereof and forming the sole connection between said beam and the other portions of the apparatus supporting the beam so as to allow frictional movement of the balance beam about said horizontal axis, and an elastically yielding support fixed upon said intermediate portion of said beam and directly carrying said pendulum above said horizontal axis and allowing frictionless movement of the pendulum relatively to the beam in complete freedom from contact with any other portion of the instrument, and there being a static field of force operating upon said pendulum tending to accentuate any occurring deflection of said pendulum from upright position by partly neutralizing the greater part of the elastic coefficient of restoring force inherent in the elastically yielding support which normally tends to restore the pendulum to upright position upon return of the balance beam to even balance.

5. In a measuring instrument, the combination, with a suspended swingable measuring member of a frictionless, elastic suspending means exclusively supporting said measuring member and allowing frictionless motion thereof, an indicator member, an elastically yielding connection fixed to said measuring member so as to swing with the same measuring member, said elastically yielding connection exclusively supporting said indicator member and also allowing the same to move frictionlessly in unobstructed manner relatively to said measuring member from a normal position and with freedom from contact with the rest of the instrument, and there being a static field of force operating upon said indicator member tending to accentuate any occurring deflection of the same indicator member from normal position by neutralizing the greater part of the elastic coefficient of restoring force inherent in said elastically yielding connection which tends to restore the indicator member to normal position upon return of the measuring member to its normal position.

GUSTAF ADOLF ISING.